United States Patent [19]

Fertig

[11] Patent Number: 4,676,603
[45] Date of Patent: Jun. 30, 1987

[54] MULTIPLEXABLE LIQUID CRYSTAL CELL

[75] Inventor: Werner Fertig, Darmstadt, Fed. Rep. of Germany

[73] Assignee: VDO Adolf Schindling AG, Frankfurt am Main, Fed. Rep. of Germany

[21] Appl. No.: 781,445

[22] Filed: Sep. 27, 1985

[30] Foreign Application Priority Data

Oct. 5, 1984 [DE] Fed. Rep. of Germany ....... 3436527

[51] Int. Cl.$^4$ .................................. G02F 1/133
[52] U.S. Cl. .................. 350/336; 350/339 R; 350/334; 427/87
[58] Field of Search ............. 350/336, 339 R, 334; 427/87

[56] References Cited

U.S. PATENT DOCUMENTS

| | | | |
|---|---|---|---|
| 4,413,883 | 11/1983 | Baraff et al. | 350/334 |
| 4,523,811 | 6/1985 | Ota | 350/336 |
| 4,534,623 | 8/1985 | Araki | 350/334 |
| 4,572,615 | 2/1986 | Nickol et al. | 350/339 R |

*Primary Examiner*—John K. Corbin
*Assistant Examiner*—Martin Lerner
*Attorney, Agent, or Firm*—Martin A. Farber

[57] ABSTRACT

The invention concerns a multiplexable liquid crystal cell having two substrates 1 and 3 spaced apart from each other. Between them a cell chamber filled with liquid-crystal substance is formed. Strip electrodes 2 are arranged on the substrate 1 and picture electrodes 4 are arranged on the substrate 3. The picture electrodes 4 are connected via metal-insulator-metal elements to data lines 5 which are also arranged on the substrate 3, the insulator being arranged on a side surface 12 of the picture electrode 4 and a connecting contact leads from the side of the insulator facing away from the picture electrode to the data line 5. A conductive layer 6 is arranged which covers the region of the edge of the picture electrode 4 and the region adjacent to it of the substrate 3, said layer consisting of a conductive material which is oxidized on its free surface, forming an oxidation layer.

9 Claims, 4 Drawing Figures

MULTIPLEXABLE LIQUID CRYSTAL CELL

BACKGROUND AND FIELD OF THE INVENTION

The present invention relates to a multiplexable liquid crystal cell having two substrates spaced apart from each other and form between themselves a cell chamber filled there being liquid-crystal substances, with strip electrodes located on one substrate on the cell-chamber side and picture electrodes located on the other substrate on the cell-chamber side positioned opposite the strip electrodes. The picture electrodes are connected via metal-insulator-metal elements with data lines also located on the other substrate, the insulator being disposed on one side surface of the picture electrode and/or of a connecting contact thereof, and the connecting contact leading to the data line from the side of the insulator facing away from the picture electrode.

In such a liquid crystal cell it is known to arrange an insulator not only against the side surface of the picture electrode but also on the surface thereof facing away from the substrate in order to prevent the connecting contact, which at least partially overlaps the two insulators, from coming into conductive contact with the picture electrode.

Such a liquid crystal cell is very expensive since the manufacture of the metal-insulator-metal element requires many manufacturing steps. After the application of the picture electrodes and data lines, the insulator must first of all be applied to the side surface and then the insulator must be applied to the surface of the picture electrode and/or the surface of strip electrode before the connecting contact can be produced.

The object of the present invention is therefore to create a liquid crystal cell of the above type which is of simple construction and can be produced at little expense.

SUMMARY OF THE INVENTION

This object is achieved in accordance with the invention by the production of a conductive layer which covers the region of the edge of the picture electrode and/or the region of a connecting contact and the region of the substrate adjoining the electrode or contact. The layer consists of a conductive material which is oxidized on its free surface forming an oxidation layer, the layer being produced by bombardment of the picture electrode and/or connecting contact and the substrate with particles of conductive material at an acute angle whereby the path of the particles is inclined from the region of the edge of the picture electrode and/or connecting contact to the plane of the picture electrode and/or connecting contact.

As a result of this development it is possible to dispense not only with a second insulator but also with a separate process for the application of the first insulator which is disposed on the side surface of the picture electrode and/or connecting contact.

Upon the bombardment of the particles of conductive material at an acute angle on the picture electrode and/or connecting contact, and on the substrate, a shadow region is produced in the region directly adjacent the picture electrode and/or connecting contact, as a result of which shadow region the thickness of the conductive layer in the shadow region is less than on the picture electrode and/or connecting contact and in a region outside of the shadow region.

The size of the shadow region is determined by the thickness of the picture electrode and/or connecting contact, the steepness of the side surface of the picture electrode and/or connecting contact to the plane of the substrate, as well as the angle at which the particles of conductive material strike the picture electrode and/or connecting contact and the substrate. The smaller this angle the larger the shadow region.

Since the conductive layer is of small thickness within the shadow region, the layer is at least substantially oxidized in this region during the oxidation process, and thereby forms an insulator resting against the side surface of the picture electrode and/or connecting contact. By selecting the process time of the oxidation, the size of the insulator can be determined in simple fashion.

The arrangement of the picture electrode, of the insulator and of the conductive layer leading to the connecting contact in a single plane, so that the side surfaces of these layers rest against each other, has the advantage that the metal-insulator-metal elements formed thereby can be produced in small size with narrow tolerance. This makes it possible also to develop the picture electrodes in small size. This, in its turn, permits the formation of a relatively large number of picture electrodes per unit of surface and thus a high degree of resolution of the characters to be displayed by the picture electrodes.

In a preferred embodiment of the invention, the thickness of the oxidation layer in the shadow region directly adjacent the picture electrode and/or connecting contact equals the thickness of the conductive material applied.

The particles of conductive material can be applied to the picture electrode and/or connecting contact and the substrate by sputtering or else by vapor deposition.

For the simple manufacture of a conductive connection, the conductive layer applied to the substrate can be applied at least partially overlapping the conducting contact and/or picture electrode.

If, with the metal-insulator-metal element adjoining the picture electrode, the conductive layer which is applied to the substrate and forms the connecting contact is applied in such a manner as to at least partially overlap the data line, then a separate connecting contact can be dispensed with.

BRIEF DESCRIPTION OF THE DRAWING

One embodiment of the invention is shown in the drawing and will be described in further detail below. In the drawing.

DETAILED DESCRIPTION OF THE PREFERRED EMBODIMENT

Figure 1:
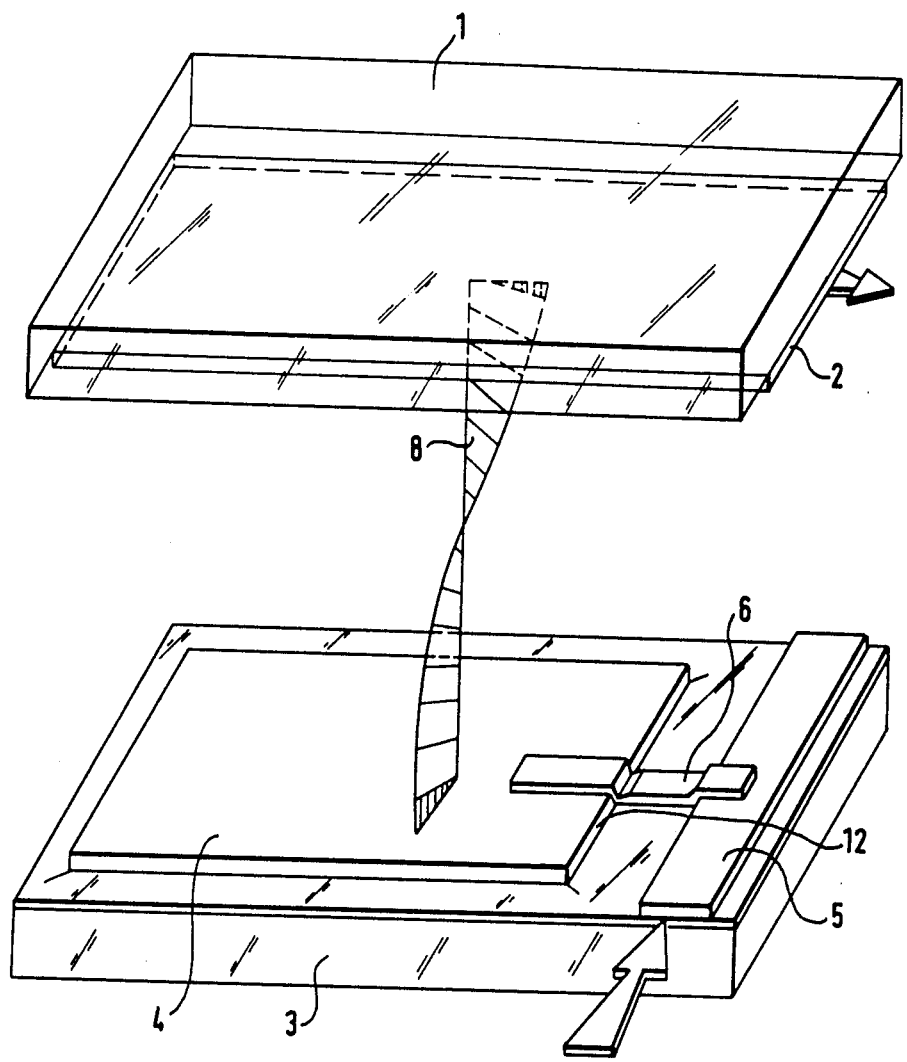
FIG. 1 is an exploded view in perspective of a liquid crystal cell according to the invention.

The liquid crystal cell shown in the figures comprises an upper substrate 1 of glass which bears a controllable strip electrode 2. The lower substrate 3, which also is formed of glass, bears a picture electrode 4. A data line 5 is also located on the substrate 3. Between the substrates 1 and 3 there is disposed a liquid crystal substance, not shown in the drawing, but being symbolized by a helix 8.

The picture electrode 4 as well as the data line 5 consist of transparent indium tin oxide.

A conductive layer 6 arranged between the picture electrode 4 and the data line 5 and overlapping them is formed of tantalum, the free surface of the conductive layer 6 being oxidized to form an insulating layer 9 of tantalum pentoxide.

Figure 4:
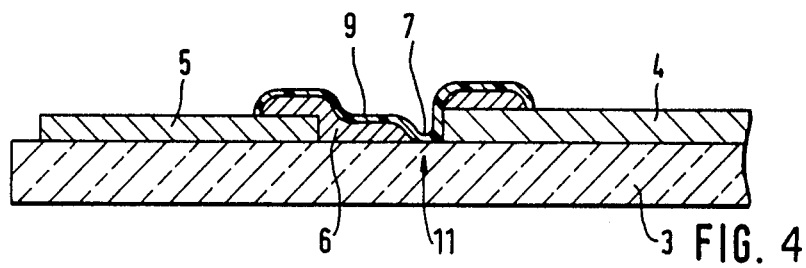
FIG. 4 shows the substrate of FIG. 3 after the oxidation process.

As shown in FIG. 4, the conductive layer 6 is produced by applying conductive material, for instance by vaporization, at an angle 10 to the region of the edge of the picture electrode 4 and the region of the substrate 3. By the application at an angle 10 there is obtained in the region directly adjacent to the picture electrode 4, as a result of the edge of the picture electrode 4, a shadow region 11 in which the conductive layer 6 has a substantially smaller thickness than in the other regions. After the application of the conductive material, the free surface of the conductive layer 6 is so oxidized in an oxidation process that the thickness of the resulting insulating layer 9 equals the thickness of the conductive material applied in the shadow region 11. Within this shadow region 11 an insulator 7 of the metal-insulator-metal element is formed by the insulator layer 9.

Figure 2:
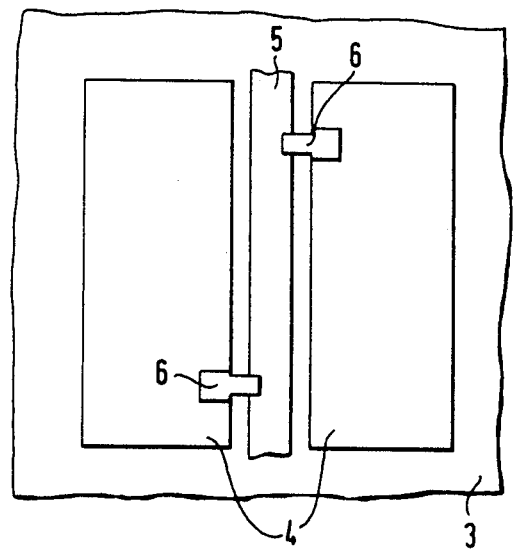
FIG. 2 is a top view of part of a substrate provided with picture electrodes.
Figure 3:
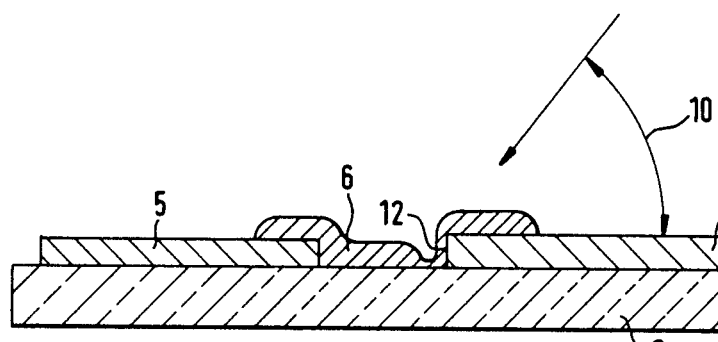
FIG. 3 is a cross section through a part of a substrate in the region of a metal-insulator-metal element before the oxidation process.

As can be noted from FIG. 2, the width of the conductive layer 6 is considerably less than the width of the picture electrode 4. It is therefore immaterial where the conductive layer 6 is arranged between the data line 5 and the picture electrode 4, provided merely that the smaller cross-sectional area of the conductive layer 6 lies completely facing a side surface 12 (FIG. 4) of the picture electrode 4.

It can furthermore be noted from FIG. 2 that in the case of one conductive layer, the metal-insulator-metal element is disposed directly adjacent the corresponding picture electrode, and in the case of the other conductive layer, directly adjacent the data line. This results from the fact that upon the application of the conductive material, a shadow region is present. In one case, the shadow is present in the region of the edge of the picture electrode and, in the other case, in the region of the edge of the data line.

In the embodiment described, the conductive material is applied by vapor deposition. It is to be understood that other methods of deposition with a preferred direction can be advantageously employed for the application of the conductive material.

I claim:

1. In a multiplexable liquid crystal cell having two substrates spaced apart from each other and form between themselves a cell chamber filled with liquid-crystal substance, there being strip electrodes supported on one substrate on the cell-chamber side and picture electrodes supported on the other substrate on the cell-chamber side opposite the strip electrodes, said picture electrodes being connected via metal-insulator-metal elements to data lines also supported on the substrate supporting the picture electrodes, the insulator being disposed on side surfaces of the picture electrode and a connecting contact extending to a data line, the improvement wherein said metal-insulator-metal elements are produced by a method comprising the steps of:
   providing a conductive layer which covers the region of an edge of the picture electrode and the region of the substrate contiguous the picture electrode, said conductive layer being formed of a conductive material,
   oxidizing the free surface of the conductive layer to form an oxidation layer; and wherein
   the step of providing the conductive layer includes a step of bombarding the picture electrode and its substrate with particles of conductive material at an acute angle relative to a plane of the substrate wherein a stream of the particles is inclined from the region of the edge of the picture electrode to a plane of the picture electrode.

2. The liquid crystal cell according to claim 1, wherein the thickness of the oxidation layer in a region which is directly adjacent to the picture electrode equals the thickness of the conductive material applied.

3. The liquid crystal cell according to claim 2, wherein the particles of conductive material are applied to the picture electrode and to its substrate by sputtering.

4. The liquid crystal cell according to claim 1, wherein the particles of conductive material are applied to the picture electrode and to its substrate by vapor disposition.

5. The liquid crystal cell according to claim 2, wherein the particles of conductive material are applied to the picture electrode and to its substrate by vapor disposition.

6. The liquid crystal cell according to claim 1, wherein the conductive layer applied to the substrate is applied so as to at least partially overlap the picture electrode.

7. The liquid crystal cell according to claim 2, wherein the conductive layer applied to the substrate is applied so as to at least partially overlap the picture electrode.

8. The liquid crystal cell according to claim 1, wherein in said step of oxidizing, the oxidizing of the conductive layer applied to a substrate extends from said picture electrode in the form of a connecting contact to at least partially overlap the data line.

9. The liquid crystal cell according to claim 2, wherein in said step of oxidizing, the oxidizing of the conductive layer applied to a substrate extends from said picture electrode in the form of a connecting contact to at least partially overlap the data line.

* * * * *